United States Patent
Abrol et al.

(10) Patent No.: US 7,333,440 B2
(45) Date of Patent: *Feb. 19, 2008

(54) RADIO LINK PROTOCOL ENHANCEMENTS TO REDUCE SETUP TIME FOR DATA CALLS

(75) Inventors: Nischal Abrol, San Diego, CA (US); Nikolai K. N. Leung, Arlington, VA (US)

(73) Assignee: Qualcomm Incorporated, San Diego, CA (US)

( * ) Notice: Subject to any disclaimer, the term of this patent is extended or adjusted under 35 U.S.C. 154(b) by 961 days.

This patent is subject to a terminal disclaimer.

(21) Appl. No.: 10/600,146

(22) Filed: Jun. 19, 2003

(65) Prior Publication Data

US 2005/0117521 A1    Jun. 2, 2005

Related U.S. Application Data

(63) Continuation of application No. 09/437,417, filed on Nov. 10, 1999, now Pat. No. 6,608,818.

(51) Int. Cl.
*H04J 13/00* (2006.01)
*G08C 25/02* (2006.01)

(52) U.S. Cl. ............ 370/252; 370/320; 370/441; 370/466; 714/748

(58) Field of Classification Search .......... None
See application file for complete search history.

(56) References Cited

U.S. PATENT DOCUMENTS

| 5,477,531 | A |   | 12/1995 | McKee et al. |
|---|---|---|---|---|
| 5,627,829 | A | * | 5/1997 | Gleeson et al. ............ 370/230 |
| 5,936,940 | A |   | 8/1999 | Marin et al. |
| 6,076,114 | A | * | 6/2000 | Wesley ................. 709/235 |
| 6,118,765 | A |   | 9/2000 | Phillips |
| 6,119,235 | A |   | 9/2000 | Vaid et al. |
| 6,208,620 | B1 | * | 3/2001 | Sen et al. ................. 370/231 |
| 6,330,451 | B1 |   | 12/2001 | Sen et al. |
| 6,405,337 | B1 |   | 6/2002 | Grohn et al. |
| 6,601,098 | B1 | * | 7/2003 | Case et al. ................ 709/224 |

FOREIGN PATENT DOCUMENTS

| WO | 9851052 | 11/1998 |
|---|---|---|
| WO | 9937071 | 7/1999 |
| WO | 0079721 | 12/2000 |

* cited by examiner

*Primary Examiner*—Chi Pham
*Assistant Examiner*—Soon D. Hyun
(74) *Attorney, Agent, or Firm*—Charles D. Brown; Karn T. Tam; Tom Rouse

(57) ABSTRACT

An improved method and system for determining round-trip time (RTT) during a radio link protocol (RLP) wireless communication link. The RTT estimate is negotiated by both sides of the RLP communication link without the need for the 3-way handshake generally required for RLP synchronization. The method includes techniques used by both sides of the RLP communication link to dynamically update and refine their initial, negotiated RTT estimates.

29 Claims, 8 Drawing Sheets

RADIO LINK PROTOCOL ENHANCEMENTS TO REDUCE SETUP TIME FOR DATA CALLS

CLAIM OF PRIORITY UNDER 35 U.S.C. §120

The present Application for Patent is a Continuation application and claims priority to patent application Ser. No. 09/437,417 entitled "RADIO LINK PROTOCOL ENHANCEMENTS TO REDUCE SETUP TIME FOR DATA CALLS" filed Nov. 10, 1999, now U.S. Pat. No. 6,608,818 and assigned to the assignee hereof and hereby expressly incorporated by reference herein.

BACKGROUND

I. Field of the Invention

The current invention relates to wireless communications. More particularly, the present invention relates to an improved method and system that requires decreased setup time in establishing a radio link protocol (RLP) data call.

II. Description of the Related Art

The use of code division multiple access (CDMA) modulation techniques is one of several techniques for facilitating communications in which a large number of system users are present. Other multiple access communication system techniques, such as time division multiple access (TDMA), frequency division multiple access (FDMA) and AM modulation schemes such as amplitude companded single sideband (ACSSB) are known in the art. These techniques have been standardized to facilitate interoperation between equipment manufactured by different companies. Code division multiple access communications systems have been standardized in the United States in Telecommunications Industry Association TIA/EIA/IS-95-B, entitled "MOBILE STATION-BASE STATION COMPATIBILITY STANDARD FOR DUAL-MODE WIDEBAND SPREAD SPECTRUM CELLULAR SYSTEMS", incorporated by reference herein, and hereinafter referred to as IS-95. In addition, a new standard for Code division multiple access communications systems has been proposed in the United States in Telecommunications Industry Association PN-4431 to be published as TIA/EIA/IS-2000-5, entitled "UPPER LAYER (LAYER 3) SIGNALING STANDARD FOR cdma2000 SPREAD SPECTRUM SYSTEMS", dated Jul. 11, 1999, incorporated by reference herein, and hereinafter referred to as IS-2000.

The International Telecommunications Union recently requested the submission of proposed methods for providing high rate data and high-quality speech services over wireless communication channels. A first of these proposals was issued by the Telecommunications Industry Association, entitled "The cdma2000 ITU-R RTT Candidate Submission." A second of these proposals was issued by the European Telecommunications Standards Institute (ETSI), entitled "The ETSI UMTS Terrestrial Radio Access (UTRA) ITU-R RTT Candidate Submission", also known as "wideband CDMA" and hereinafter referred to as W-CDMA. A third proposal was submitted by U.S. TG 8/1 entitled "The UWC-136 Candidate Submission", hereinafter referred to as EDGE. The content of these submissions is public record and is well known in the art.

IS-95 was originally optimized for transmission of variable-rate voice frames. In order to support two-way voice communications, as typified in wireless phone applications, it is desirable that a communication system provides fairly constant and minimal data delay. For this reason, IS-95 systems are designed with powerful forward error correction (FEC) protocols and vocoders which are designed to respond gracefully to voice frame errors. Error control protocols which require frame retransmission procedures add unacceptable delays to voice transmission, so are not designed into the IS-95 specification.

The optimizations which make the standalone IS-95 specification ideal for voice applications make it difficult to use for packet data applications. In many non-voice applications, such as the transmission of Internet protocol (IP) data, the delay requirements of the communication system are much less stringent than in voice applications. In the Transmission Control Protocol (TCP), probably the most prevalent of protocols used in an IP network, virtually infinite transmission delays are allowed in order to guarantee error-free transmission. TCP uses retransmissions of IP datagrams, as IP packets are commonly called, to provide this transport reliability.

IP datagrams are generally too large to fit into a single IS-95 frame. Even after dividing an IP datagram into segments small enough to fit into a series of IS-95 frames, an entire series of IS-95 frames would have to be received without error for the single IP datagram to be useful to TCP. The frame error rate typical of an IS-95 system make the probability of error-free reception of all segments of a single datagram very low.

As described in IS-95, alternative service options enable the transmission of other types of data may in lieu of voice frames. The TIA/EIA/IS-707-A, entitled "DATA SERVICE OPTIONS FOR SPREAD SPECTRUM SYSTEMS", hereafter referred to as IS-707, describes procedures used in the transmission of packet data in an IS-95 system.

Radio Link Protocol (RLP) is described in TIA/EIA/IS-707-A.8, entitled "DATA SERVICE OPTIONS FOR SPREAD SPECTRUM SYSTEMS: RADIO LINK PROTOCOL TYPE 2", hereinafter referred to as RLP2, and incorporated herein by reference. RLP2 incorporates an error control protocol with frame retransmission procedures over the IS-95 frame layer. RLP is of a class of error control protocols known NAK-based ARQ protocols, which are well known in the art. The IS-707 RLP facilitates the transmission of a byte-stream, rather than a series of voice frames, through an IS-95 communication system.

Several protocol layers typically reside above the RLP layer. IP datagrams, for example, are typically converted into a Point-To-Point Protocol (PPP) byte stream before being presented as a byte stream to the RLP protocol layer. As the RLP layer ignores the protocol and framing of higher protocol layers, the stream of data transported by RLP is said to be a "featureless byte stream".

RLP was originally designed to satisfy the requirements of sending large frames through an IS-95 channel. For example, if an IP datagram of 500 bytes were to be simply sent in IS-95 frames carrying 20 bytes each, the IP datagram would fill 25 consecutive IS-95 frames. Without some kind of error control layer, all 25 of these frames would have to be received without error in order for the IP datagram to be useful to higher protocol layers. On an IS-95 channel having a 1% frame error rate, the effective error rate of the IP datagram delivery would be $(1-(0.99)^{25})$, or 22%. This is a very high error rate compared to most networks used to carry Internet Protocol traffic. RLP was designed as a link layer protocol which would decrease the error rate of IP traffic to be comparable to the error rate typical of a 10Base2 ethernet channel.

RLP is a negative acknowledgment (NAK) based protocol in which NAK frames are sent to prompt retransmission of data frames lost because of communication errors. The timing of NAK frame transmission is based on estimates of round-trip time (RTT) determined at the start of an RLP session. RTT determination in existing version of RLP requires a 3-way handshake in which both sides transmit specific frame types based on the frame types received. No data is sent by either side until the completion of the 3-way handshake. This 3-way handshake consumes time that could otherwise be used to transmit data.

In a typical data services configuration, a laptop computer is connected to a wireless modem that communicates with a network over an RLP connection. In a typical laptop computer application like browsing an Internet web page, the computer does not continuously exchange data with the network. Instead, the computer typically sends a short request for data containing the address of a web page. The wireless modem responds by establishing an RLP session with the local base station, and relays the request through the base station to the network. Through this RLP session, the wireless modem then receives the requested data (such as the contents of a web page), and displays the data for the user. While the user is reading the displayed data, no data is exchanged between the wireless modem and the base station or network.

In order to allow the most efficient use of wireless spectrum, a typical network employs "activity timers" that tear down an RLP session after a predetermined period of link inactivity. If this happens before the laptop computer attempts to send more data through the wireless modem, then another RLP session is established to service the new data. The re-establishing of a new RLP session causes additional delay in exchanging data with the network, which can be characterized by "sluggishness" of the laptop computer.

Bringing up a new RLP session to send new data will always take longer than sending the new data over an already-existing RLP session. Existing versions of RLP require the performance of a 3-way handshake to establish an RLP session. It is therefore highly desirable to minimize the overhead required to establish an RLP session, including minimizing or eliminating the delay inherent in the 3-way handshake.

SUMMARY

The present invention may be used to allow transmission of RLP data without requiring the completion of a 3-way handshake. The present invention is applicable to any communication system employing transmission of a byte stream over a wireless channel. The present invention is applicable to systems such as cdma2000, W-CDMA, and EDGE, wherein a byte stream may be carried within over-the-air frames specified for use by the wireless communication system.

The present invention includes methods of negotiating an initial RTT estimate to be used for an RLP call. The initial RTT estimate, along with other RLP parameters such as NAK scheme and encryption parameters, are negotiated during service negotiation. At the conclusion of service negotiation, both sides of the RLP communication link are armed with an initial RTT estimate and may begin sending RLP data frames without performing the 3-way handshake.

The present invention includes methods for the base station to determine and update initial RTT estimate values proposed during service negotiations. The present invention also includes methods by which both sides of an RLP communication link can dynamically update and refine the initial RTT estimates specified during service negotiation.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION

Figure 1:
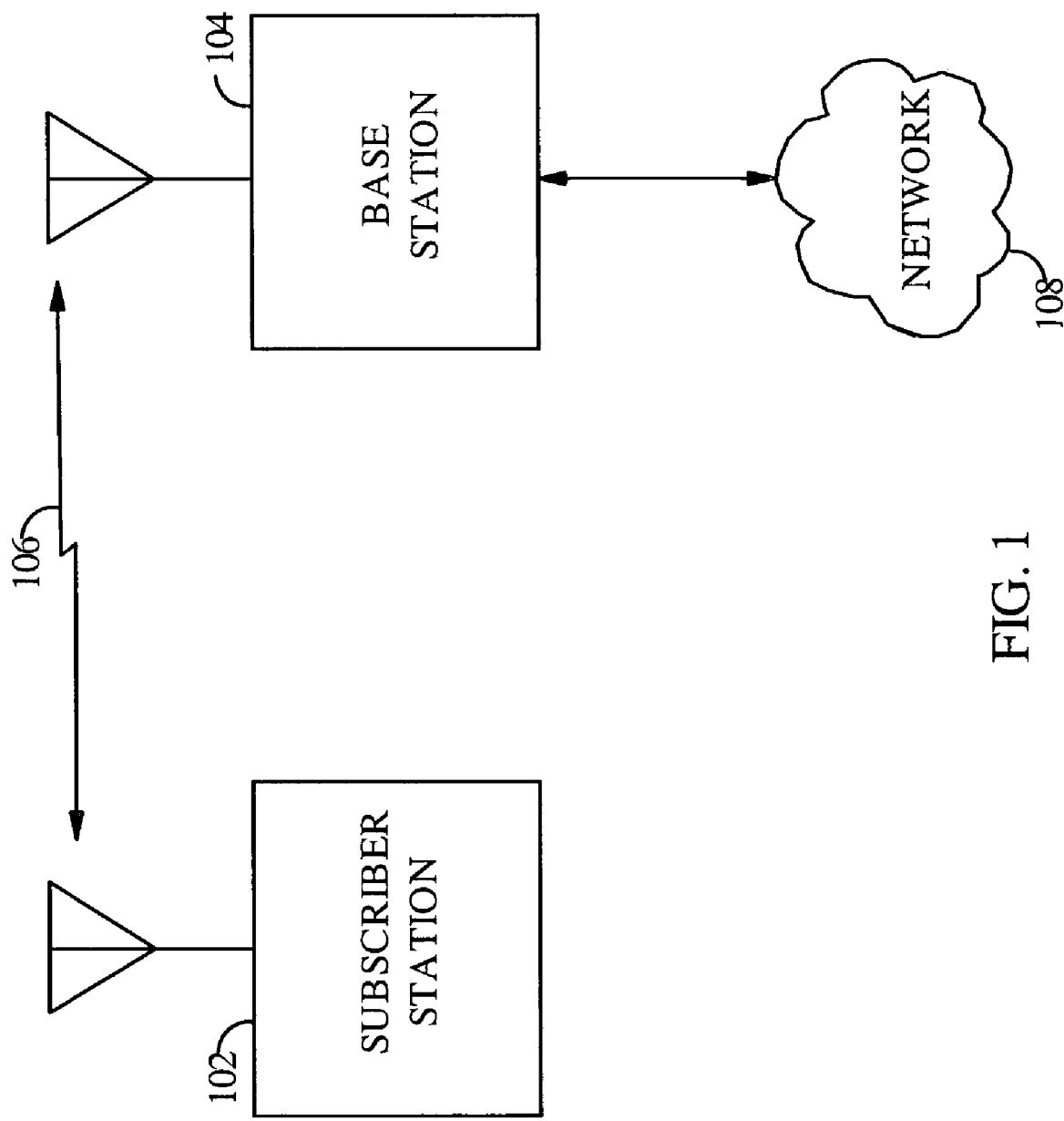
FIG. 1 is a diagram of a data communications system configured in accordance with an embodiment of the invention.

FIG. 1 is a diagram of a data communications system configured in accordance with an embodiment of the invention. As shown, subscriber station 102 communicates with network 108 through wireless communication channel 106 and base station 104.

Subscriber station 102 and base station 104 establish a radio link protocol (RLP) communication link to convey data byte streams through wireless communication channel 106. The data bytes exchanged between subscriber station 102 and network 108 through base station 104 may be Internet Protocol (IP) datagrams converted into a byte stream using such conversion protocols as point-to-point protocol (PPP). Both IP and PPP protocols are well known in the art.

Before any data can be exchanged between subscriber station 102 and base station 104, the RLP link between the two must be established. Establishing an RLP link includes establishing a round-trip time (RTT) to be used by both subscriber station 102 and base station 104 for negative acknowledgment (NAK) timing. In an exemplary embodiment of the present invention, subscriber station 102 sends base station 104 a Service Request Message specifying that subscriber station 102 can accept an initial RTT estimate sent in a Service Response Message from base station 104. Upon receiving this Service Request Message, base station 104 sends subscriber station 102 a Service Response Message that includes an initial RTT estimate to be used by subscriber station 102. After base station 104 provides an initial RTT estimate to subscriber station 102, there is no need to perform a time-consuming 3-way handshake. Thereafter, when either side transmits a NAK frame, it uses the delay between transmission of the NAK frame and receipt of a corresponding retransmit frame to update its RTT estimate for use in the ongoing RLP communication link.

Figure 2:
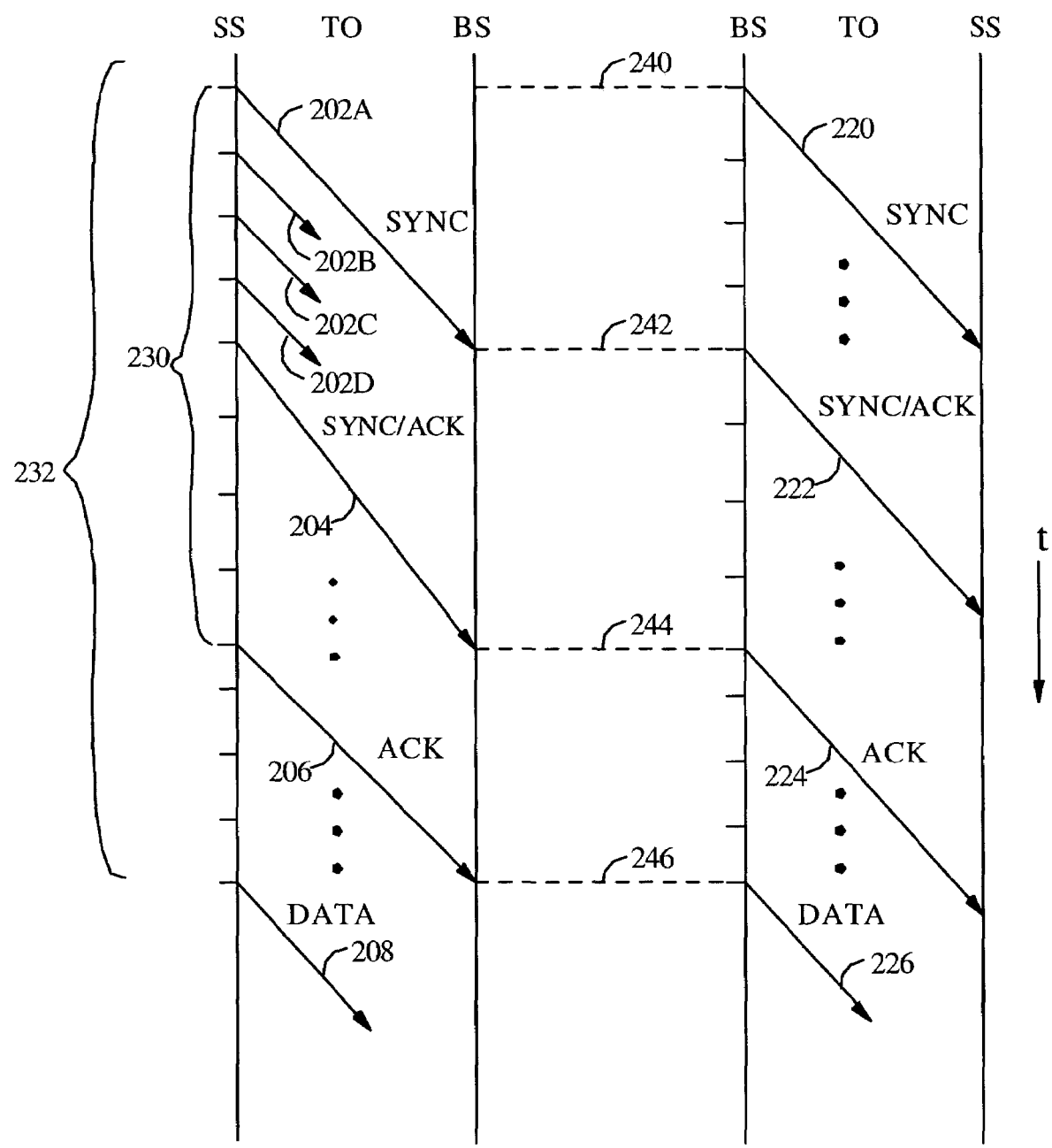
FIG. 2 is a diagram showing the flow of messages used to establish an RTT estimate using an RLP 3-way handshake.

FIG. 2 shows how an initial RTT estimate is established in conventional RLP communication links using the 3-way handshake. Subscriber station 102 transmits SYNC frames 202, SYNC/ACK frames 204, ACK frames 206 and data frames 208 to base station 104 on the reverse link. Base station 104, in turn, transmits SYNC frames 220, SYNC/ACK frames 222, ACK frames 224 and data frames 226 to subscriber station 102 on the forward link. In the example shown, round trip time (RTT) 230 is 8 frames long. The entire synchronization period 232 of generating a first RTT estimate is 12 frames long, or one and one half times as long as RTT.

At the time of starting RLP synchronization 240, both sides transmit SYNC frames 202 and 220. As shown, subscriber station 102 transmits one SYNC frame in every frame period. Base station 104 also begins the synchronization process by transmitting one SYNC frame 220 in every frame period.

At time 242, after half of first RTT period 230 and after subscriber station 102 has sent four SYNC frames 202a to 202d, subscriber station 102 receives the first SYNC frame 220 transmitted by base station 104. Upon receiving this first SYNC frame 220, subscriber station stops transmitting SYNC frames and instead transmits one SYNC/ACK frame 204 every frame period. Also at time 242, base station 104 receives the first SYNC frame 202a transmitted by subscriber station 102. Upon receiving this first SYNC frame 202a, base station 104 stops transmitting SYNC frames and instead transmits one SYNC/ACK frame 222 every frame period.

At time 244, subscriber station 102 receives the first SYNC/ACK frame 222 transmitted by base station 104. Upon receiving this first SYNC/ACK frame 222, subscriber station stops transmitting SYNC/ACK frames and instead transmits one ACK frame 206 every frame period. Also at time 244, base station 104 receives the first SYNC/ACK frame 204 transmitted by subscriber station 102. Upon receiving this first SYNC/ACK frame 204, base station 104 stops transmitting SYNC/ACK frames and instead transmits one ACK frame 224 every frame period.

At time 246, subscriber station 102 receives the first ACK frame 224 transmitted by base station 104. Upon receiving this first ACK frame 224, subscriber station stops transmitting ACK frames and can begin sending Data frames 208 every frame period. Also at time 246, base station 104 receives the first ACK frame 206 transmitted by subscriber station 102. Upon receiving this first ACK frame 206, base station 104 stops transmitting ACK frames and can begin sending Data frames 226.

The period between time 240 and time 246 is one and one half times as long as the RTT 232 used for timing of subsequent NAK frames. In other words, the time between transmitting the first SYNC frames 240 and the transmitting the first data frames 246 is one and one half times as long as RTT 232. If RTT 230 is 8 frames as shown, then the time required to perform the 3-way handshake 232 is 12 frames.

If any SYNC, SYNC/ACK or ACK frames are lost to communication errors during the 3-way handshake, this synchronization time can be longer. Additionally, such communication errors can cause the resultant RTT estimate to be longer than the actual RTT of the RLP link. An RTT estimate that is longer than the actual RTT of the RLP link leads to undesirable delays in sending additional NAK frames when a previous NAK frame is lost (again, due to communication errors). Such delays can cause sluggishness in the protocol and can degrade the throughput of the RLP link.

Figure 3A:
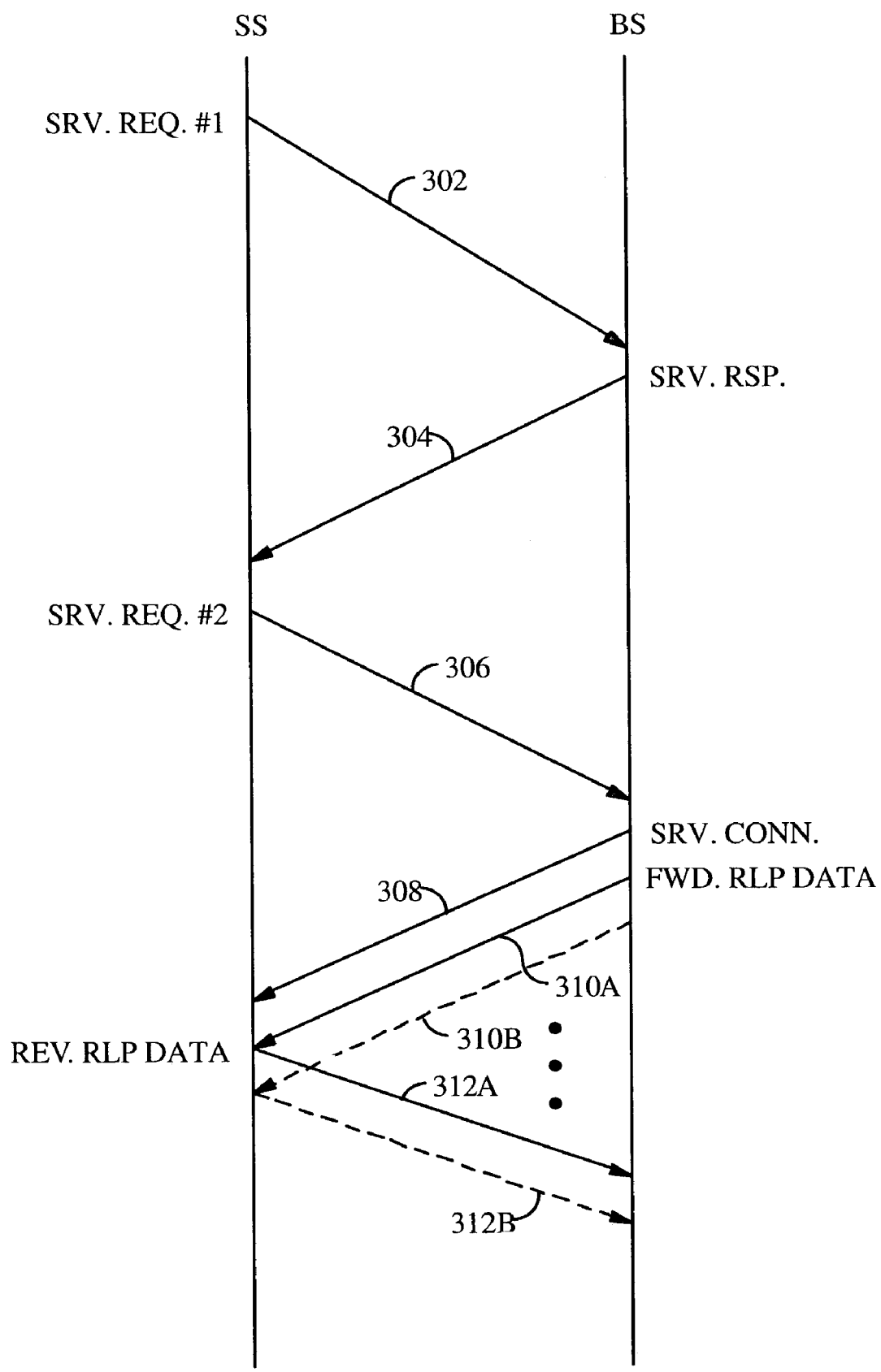
FIG. 3a is a diagram showing the flow of messages used to establish a subscriber station originated RLP call having an RTT estimate in accordance with an embodiment of the invention.

FIG. 3a is a diagram of an improved message flow used to establish an RTT estimate for a subscriber station originated RLP call in accordance with an embodiment of the invention. Instead of performing a 3-way handshake, base station 104 sends subscriber station 102 an initial RTT estimate to use in an over-the-air message prior to establishing the RLP link.

In the exemplary embodiment, subscriber station 102 begins by transmitting a Service Request Message 302 to base station 104. In the preferred embodiment of the invention, this message includes indications that subscriber station 102 supports receiving an initial RTT from base station 104 without a 3-way handshake. In the preferred embodiment, Service Request Message 302 optionally includes additional parameters such as specifying one or more NAK schemes supported by subscriber station 102. Service Request Message 302 also optionally includes encryption parameters for the RLP communication link.

A NAK scheme is characterized by the number of NAK frames sent after each expiration of a NAK timer when a corresponding retransmit frame was not received. An example of a NAK scheme is a 1,2,3 NAK scheme wherein first one NAK is sent. If the NAK timer associated with that first "round" of NAK's expires without the reception of a corresponding retransmit frame, then another round of NAK's consisting of two NAK frames is transmitted. If the NAK timer associated with the second round of NAK's expires without receiving at least one corresponding retransmit frame, then a third round of three NAK's is transmitted. Other possible NAK schemes include a five-round 1,1,1,1,1 scheme, a two-round 1,2 scheme. Alternately, Service Request Message 302 may indicate a no-NAK scheme appropriate for a synchronous RLP protocol, as is well known in the art.

Upon receiving Service Request Message 302 indicating no 3-way handshake, base station 104 transmits Service Response Message 304 containing any additional or proposed modifications to link parameters. Upon receiving Service Response Message 304, subscriber station 102 transmits a second Service Request Message 306 indicating acceptance or rejection of the parameters proposed in Service Response Message 304. Upon receiving Service Request Message 306, base station 104 transmits Service Connect Message 308 indicating the final link parameters to be used. Service Response Messages 304 and 308 and Service Connect Message 308 may all additionally indicate NAK schemes or encryption parameters as discussed above.

After transmitting Service Connect Message 308, base station 104 may immediately begin to transmit Data frames 310 in subsequent frame periods. Upon receiving Service Connect Message 308, subscriber station 102 may begin immediately transmitting Data frames 312 to base station 104. As discussed in IS-2000, transmission of Data frames 310 and 312 may also be delayed until an "action time" specified in one or more of the previous messages, or until a Service Connect Complete Message (not shown) is received by one or both sides. One skilled in the art will appreciate that an additional "action time" parameter or a Service Connect Complete Message may be employed without departing from the present invention.

Upon receiving the first Service Request Message 302, base station 104 may also elect to send Service Connect Message 308 immediately. This short cut makes it unnecessary to spend time transmitting Service Response Message 304 and Service Request Message 306. Such a short cut only works when the parameters proposed by base station 104 in Service Connect Message 308 are supported by subscriber station 102 and are appropriate for the type of data to be exchanged over the RLP communication link.

In the preferred embodiment, if no specific NAK scheme is indicated in the various messages, both sides assume a predetermined default NAK scheme, for example the 1,2,3 scheme described above. Allowing such a predetermined default NAK scheme preserves message space and bandwidth during service negotiation.

In the preferred embodiment, the format of each of the messages (Service Request Message 302, Service Response Messages 304 and 308 and Service Connect Message 308) is as described in the aforementioned IS-2000 specification. In the preferred embodiment, each of the messages includes an RLP_BLOB section, which is a new form of BLOB adapted for RLP negotiation purposes. BLOB in IS-2000 is short for "block of bits." In the preferred embodiment, the RLP_BLOB includes the initial RTT estimate to be used and the NAK scheme. An exemplary format for RLP_BLOB is described in Table 1 below.

TABLE 1

| Field | Length (bits) |
|---|---|
| RLP_BLOB_ID | 3 |
| RTT | 4 |
| NAK_ROUNDS_FWD | 3 |
| NAK_ROUNDS_REV | 3 |
| NAK_ROUNDS_FWD occurrences of the following: | |
| NAK_PER_ROUND_FWD | 3 |
| NAK_ROUNDS_REV occurrences of the following: | |
| NAK_PER_ROUND_REV | 3 |

In Table 1, the RLP_BLOB_ID field indicates a version number of the RLP_BLOB format used to interpret the rest of the contents of the RLP_BLOB section. RTT is the initial RTT value to be used in the call. NAK_ROUNDS_FWD indicates the number of NAK rounds to be used for forward link RLP transmissions. NAK_ROUNDS_REV indicates the number of NAK rounds to be used for reverse link RLP transmissions. As indicated, the NAK_ROUNDS_REV field is followed by a number of NAK_PER_ROUND_FWD fields corresponding to the value in the NAK_ROUNDS_FWD field. The last of the NAK_PER_ROUND_FWD fields is followed by a number of NAK_PER_ROUND_REV fields corresponding to the value in the NAK_ROUNDS_REV field. If the NAK_ROUNDS_FWD field has a value of zero, then the NAK_PER_ROUND_REV fields (if any) will immediately follow the NAK_ROUNDS_REV field.

For example, in a message indicating that a 1,2,3 NAK scheme on both forward and reverse links, the RLP_BLOB field has a NAK_ROUNDS_FWD value of 3 and a NAK_ROUNDS_REV value of 3. The NAK_ROUNDS_REV field is followed by three NAK_PER_ROUND_FWD fields having values 1, 2 and 3 respectively. The last NAK_PER_ROUND_FWD field is followed by three NAK_PER_ROUND_REV fields having values 1, 2 and 3 respectively.

In addition to using the message types described above, initial RTT times, NAK schemes and encryption parameters may be negotiated using RLP_BLOB sections in other types of messages. Such message types include but are not limited to the General Handoff Direction Message (GHDM) and Universal Handoff Direction Message (UHDM) described in the aforementioned IS-2000.

In the preferred embodiment, any of the previously discussed messages that omit the RLP_BLOB section is interpreted as indicating the performance of a 3-way handshake. The NAK scheme may then be a predetermined default, or may be negotiated during the 3-way handshake.

In an alternate embodiment, base station 104 may further reduce the number of messages required to specify RTT and NAK schemes for an RLP call. By keeping track of the options supported in previous RLP calls to each subscriber station, base station 104 can begin a call by transmitting a Service Connect Message 308 specifying the RLP parameters to be used. After sending Service Connect Message 308, and without receiving a Service Request Message 302 or Service Response Message from subscriber station 102, base station 104 begins transmitting user data.

Several methods may be employed by base station 104 to determine the initial RTT estimate to specify to a subscriber station at the start of an RLP call. In a preferred embodiment, base station 104 obtains the initial RTT estimate by adding a predetermined guard time to the average of RTT values computed during 3-way handshakes for previous calls. In an alternate embodiment, the initial RTT estimate is configured in base station 104 by a wireless service operator.

Figure 3B:
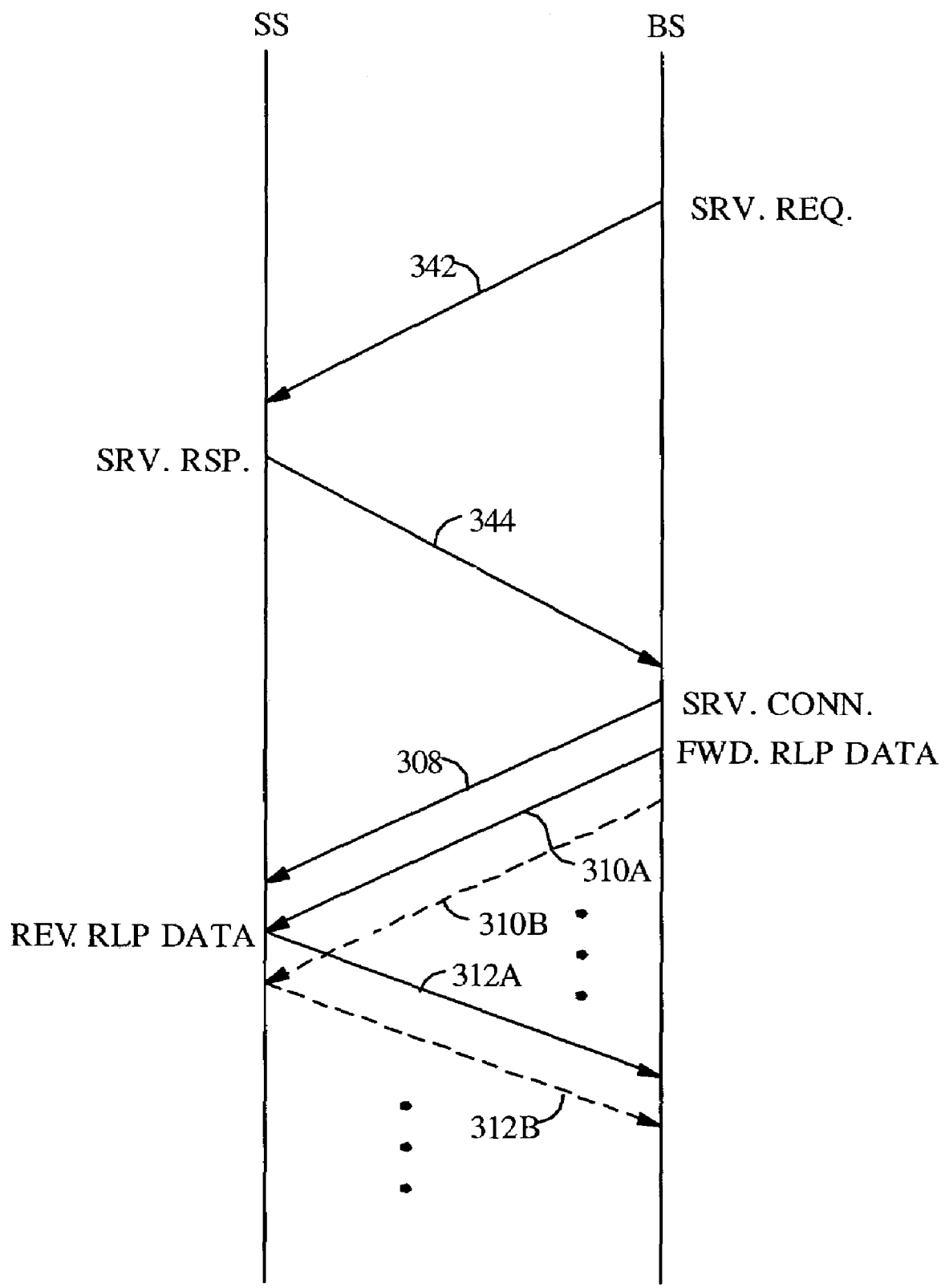
FIG. 3b is a diagram showing the flow of messages used to establish a base station originated RLP call having an RTT estimate in accordance with an embodiment of the invention.

FIG. 3b is a diagram showing a variation of the improved message flow used to establish an RTT estimate for a base station originated RLP call in accordance with an embodiment of the invention. In contrast to a subscriber station originated call, in a base station originated call Service Request Message 342 is transmitted by base station 104 and Service Response Message 344 is transmitted by subscriber station 102. Service Connect Message 308 has the same format and content discussed above. As shown, base station 104 begins transmitting forward RLP data frames 310 immediately after Service Connect Message 308. Upon receiving Service Connect Message 308, subscriber station 102 begins transmitting reverse RLP data frames 312.

In the exemplary embodiment, Service Request Message 342 includes a proposal that both sides of the link use an initial RTT estimate instead of using the 3-way handshake. As shown, subscriber station 102 accepts the proposal in Service Response Message 344, and the 3-way handshake is not performed between Service Connect Message 308 and RLP data frames 310 and 312.

All the same RLP parameters described in conjunction with subscriber station originated RLP calls can be negotiated in the messages shown for a base station originated RLP call. For example, Service Request Message 342 may include a proposed NAK scheme, which is accepted in Service Response Message 344.

Figure 4A:
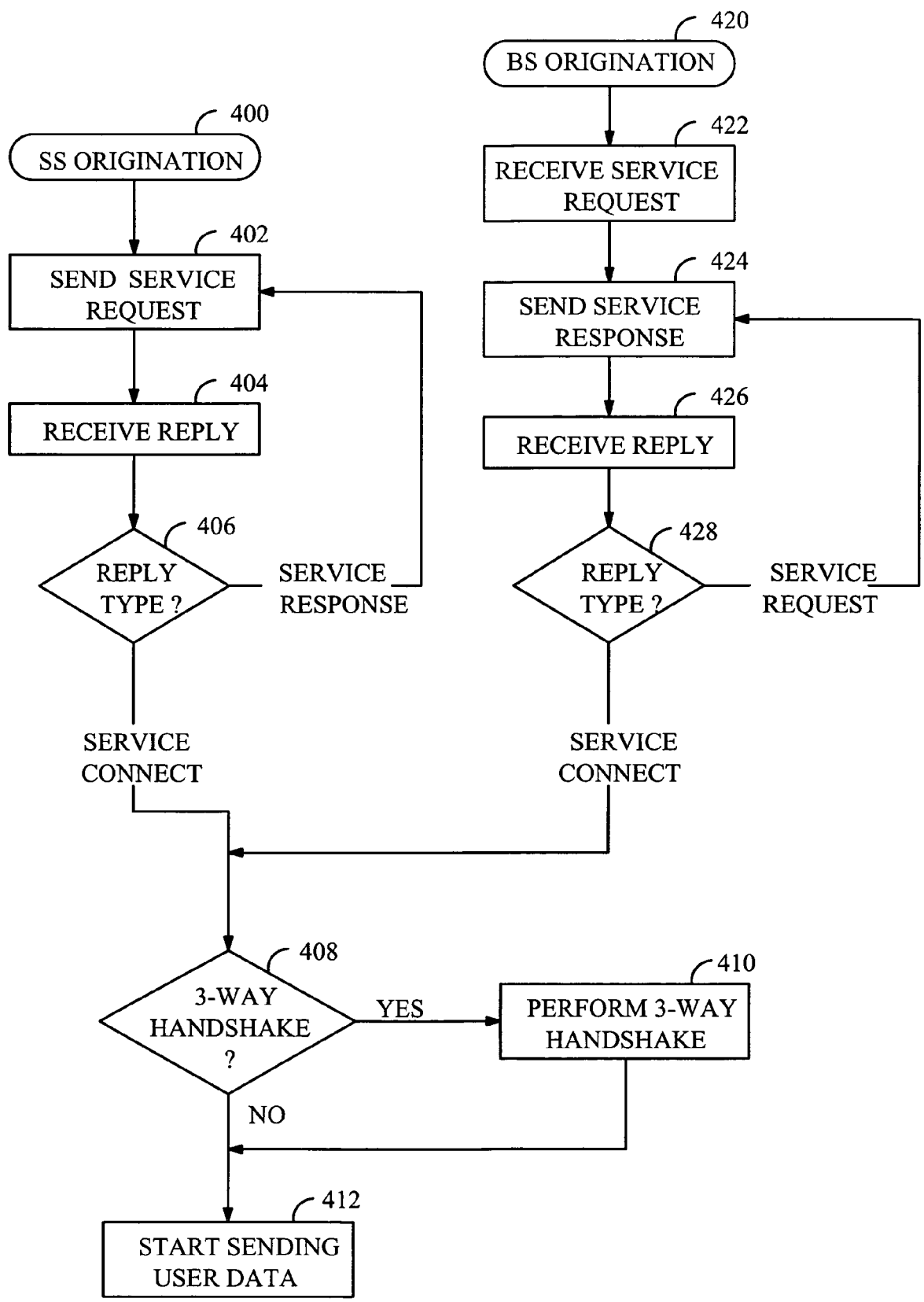
FIG. 4a is a flowchart of the steps taken by a subscriber station to initialize and use an RLP link in accordance with an embodiment of the invention.

FIG. 4a is a flowchart of the steps taken by a subscriber station to initialize and use an RLP communication link in accordance with an embodiment of the invention. The steps are shown for a subscriber station originated RLP call, such as that shown in FIG. 3a, and for a base station originated RLP call, such as that shown in FIG. 3b.

In a subscriber station originated RLP call 400, the subscriber station initiates service negotiations by sending a first Service Request Message 402 indicating the subscriber station's ability to negotiate an initial RTT estimate during service negotiation or other proposed RLP parameters. The subscriber station then receives and decodes the response 404 from the base station. The type of the response received is evaluated 406 to decide whether to negotiate further RLP parameters. If the message received was a Service Response Message, perhaps proposing changes to the RLP parameters previously sent, then the subscriber station sends another Service Request Message 402. The new Service Request Message contains a set of parameters that either match or modify the new RLP parameters proposed by the base station. The subscriber station then waits until it receives another response 404 to the most recent Service Request Message.

Eventually, the response type is found at step 406 to be a Service Connect Message containing the RLP parameters to be used. The Service Connect Message is evaluated at step 408 to determine whether the Service Connect Message indicates performance of a 3-way handshake. If the Service Connect Message indicates performance of a 3-way handshake, then the 3-way handshake is performed 410 prior to starting to send user data 412. If the Service Connect Message indicates that a the 3-way handshake is not necessary and instead specifies an initial RTT estimate to be used, then the subscriber station may immediately begin to send user data 412.

As mentioned previously, the Service Connect Message may indicate that a 3-way handshake is not necessary, but not include initial RTT estimate. In this case, the subscriber station will use a predetermined default initial RTT estimate.

In a base station originated RLP call 420, the subscriber station receives and decodes a first Service Request Message 422 from the base station. This Service Request Message might indicate that the base station supports specifying an initial RTT estimate during service negotiation. The subscriber station responds by sending a Service Response Message 424, indicating that the subscriber also supports using an initial RTT estimate received during service negotiation. The subscriber station then receives and decodes the next response message 426 sent by the base station. The type of response is evaluated 428. The response may be another Service Request Message, for example indicating a proposal for a particular NAK scheme or other additional RLP parameters. The subscriber station then sends another Service Response Message 424 indicating acceptance or rejection of the additional RLP parameters. When a Service Connect Message is received, then processing passed from step 428 to step 408 previously described.

Figure 4B:
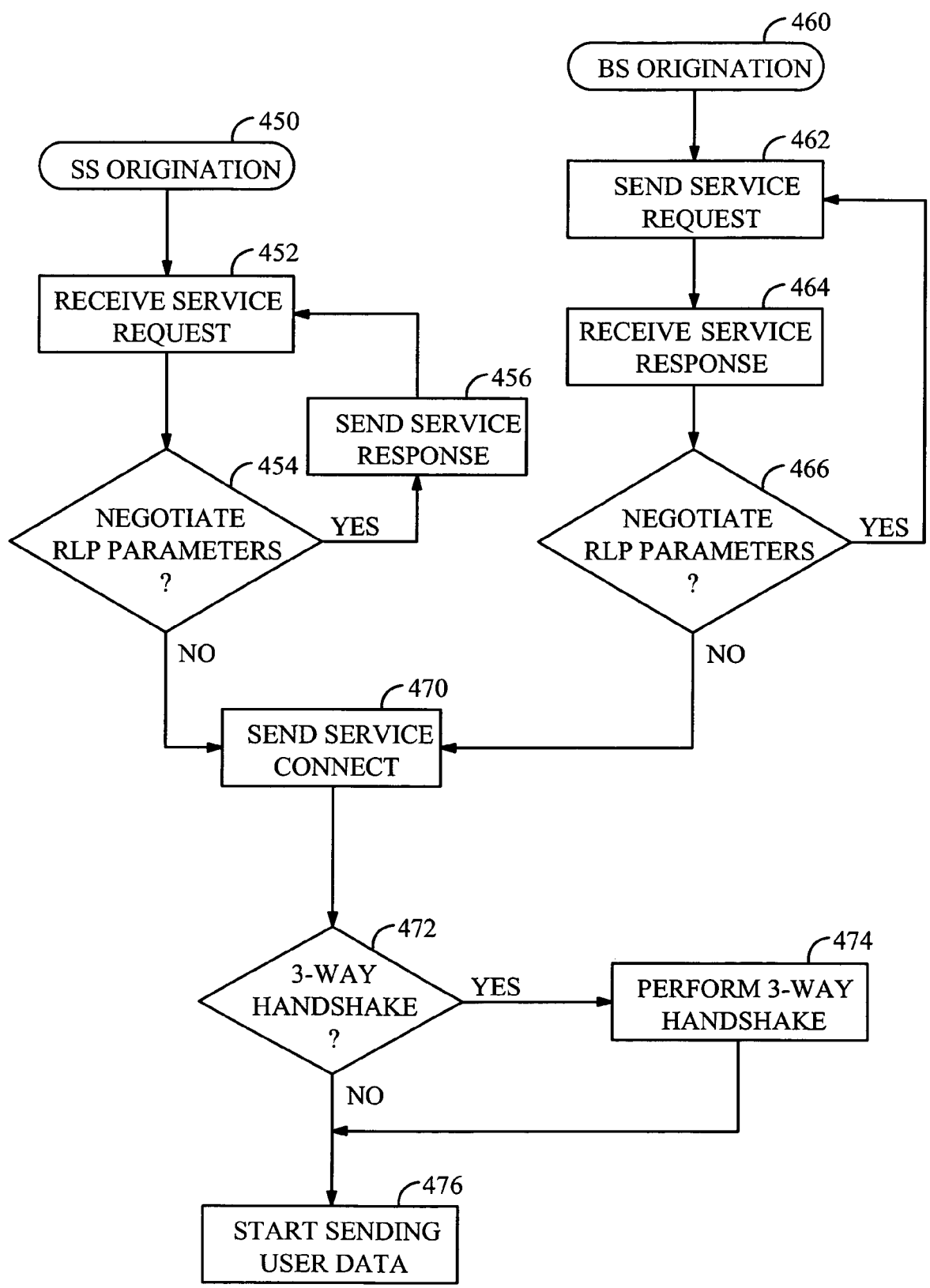
FIG. 4b is a flowchart of the steps taken by a base station to initialize and use an RLP link in accordance with an embodiment of the invention.

FIG. 4b is a flowchart of the steps taken by a base station to initialize and use an RLP communication link in accordance with an embodiment of the invention. The steps are shown for a subscriber station originated RLP call, such as that shown in FIG. 3a, and for a base station originated RLP call, such as that shown in FIG. 3b.

In a subscriber station originated RLP call 450, the base station receives and decodes a first Service Request Message 452 indicating the subscriber station's ability to negotiate an initial RTT estimate during service negotiation or other proposed RLP parameters. Next, the RLP parameters indicated in the Service Request Message are evaluated 454 to determine whether any parameter changes should be negotiated. If so, the base station sends a new set of proposed RLP parameters in a Service Response Message and sends it to the subscriber 456.

If the RLP parameters evaluated at step 454 are acceptable to the base station, the base station sends a Service Connect Message 470, indicating the RLP parameters to be used. The base station then decides 472, based on the contents of the Service Connect Message, whether to perform a 3-way handshake. If so, the base station performs a 3-way handshake 474 and then begins sending user data. If no 3-way handshake is indicated by the Service Connect Message, then the base station proceeds directly from step 472 to sending user data 476.

In a base station originated RLP call 460, the base station begins service negotiation by sending a Service Request Message 462 to the subscriber station. This Service Request Message indicates that the base station supports specifying an initial RTT estimate during service negotiation. The base station then receives and decodes the Service Response Message received from the subscriber station 464.

The RLP parameters indicated in the Service Response Message are evaluated 466 to determine whether any parameter changes should be negotiated. If so, the base station goes back to step 462 and sends a new set of proposed RLP parameters in a Service Request Message. Otherwise, the base station sends a Service Connect Message 470 and proceeds from that step as previously described.

Figure 5:
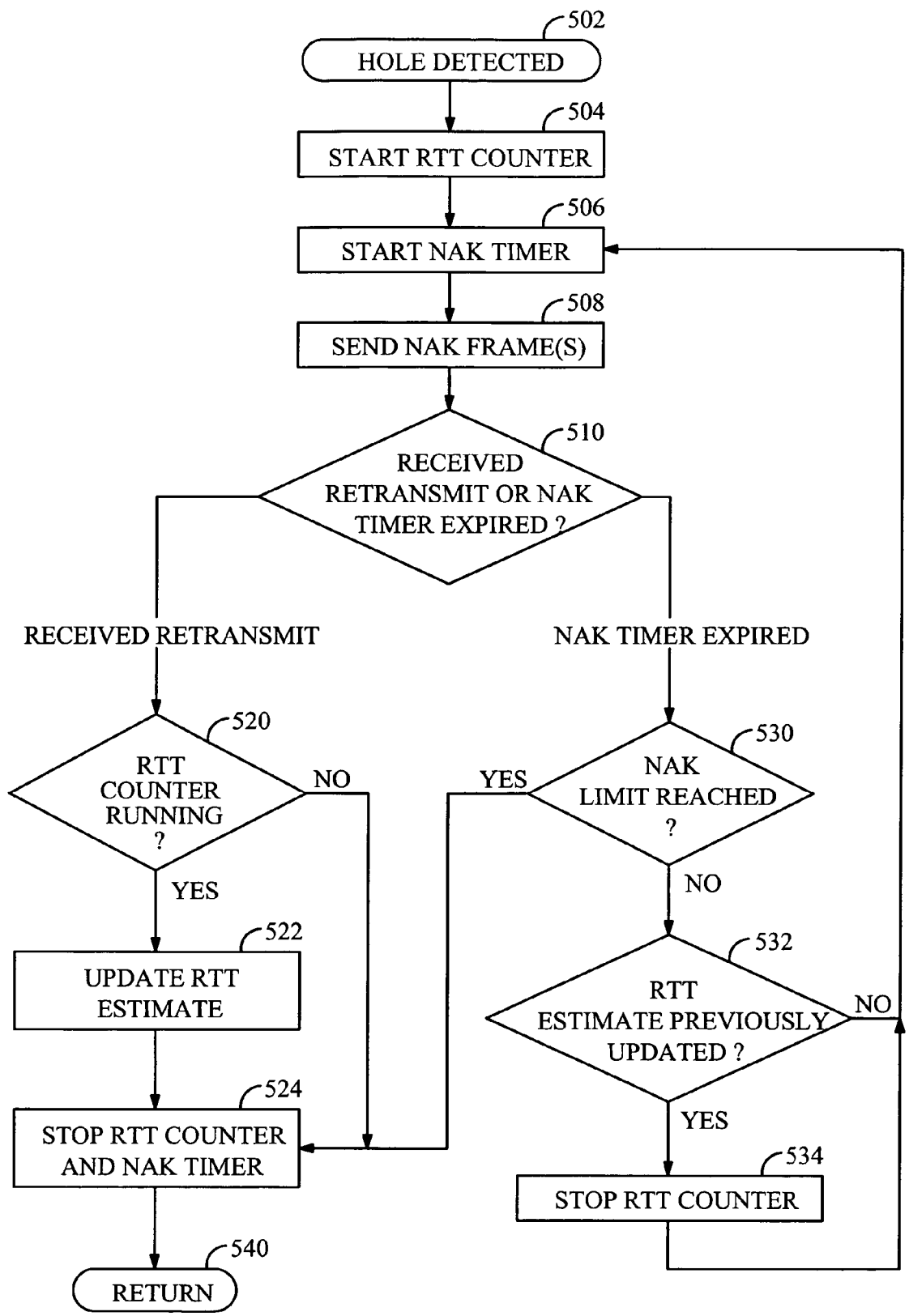
FIG. 5 is a flowchart of the steps used to update RTT estimates during an RLP session in accordance with an embodiment of the invention.

FIG. 5 is a flowchart of the steps used to update RTT estimates during an RLP session in accordance with an embodiment of the invention. In the case that the initial RTT estimate negotiated during service negotiation, it is advantageous for both sides to be able to adjust their RTT estimates according to measurements made during the call. This method uses information gathered during the transmission of NAK and retransmit frames to update the RTT estimate dynamically during an RLP call, resulting in an RTT update process that is integrated into the NAK process. For convenience, the procedure is described below from the viewpoint of a subscriber station in an RLP call. One skilled in the art will recognize that embodiments of the procedure may be performed by the subscriber station, the base station, or both without departing from the present invention.

The RTT estimate update procedure begins when the subscriber station detects a sequence number hole 502. The subscriber station starts an RTT counter 504 to measure how long it takes to receive a retransmit frame for the one or more NAK frames to be sent. The subscriber station also initializes a NAK timer with the current RTT estimate and starts the NAK timer 506. The subscriber station then sends the number of NAK frames 508 associated with the first round in the current NAK scheme.

Step 510 evaluates whether a corresponding retransmit frame is received before the NAK timer expires. If so, then the RTT counter is checked at step 520. If the RTT counter is not running when the retransmit frame is received, then the RTT counter and NAK timer are stopped as necessary. If the RTT counter is still running when a retransmit frame is received, then the RTT estimate being used for the RLP call is updated 522 according to the new estimate. In an exemplary embodiment, the new RTT estimate is computed by performing a weighted average of the value of the old RTT estimate and the sum of the RTT timer and a predetermined guard time. One skilled in the art will appreciate that various other combining methods may be used without departing from the present invention. These other methods include replacing the RTT estimate with the sum of the value of the RTT timer and a guard time.

After updating the RTT estimate 522, the RTT counter and NAK timer are stopped, and the RTT update process integrated into the NAK process ends 540. If at step 520 the NAK timer is found to be not running, then the updating of RTT at step 522 is skipped, and the method proceeds directly from step 520 to step 524.

If, at step 510, the subscriber station discovers that the NAK timer has expired before a corresponding retransmit frame was received, then the subscriber station evaluates 530 how many NAK rounds have already passed without receiving a corresponding retransmit frame. The limit to the number of NAK rounds in the current NAK scheme was determined at the beginning of the call, either through the aforementioned NAK_ROUNDS_REV field, by the aforementioned predetermined default NAK scheme. If the number of NAK rounds passed is equal that limit, then the NAK limit has been reached. If the NAK limit has been reached, then no more NAK rounds are permitted for the corresponding hole, and the subscriber station proceeds to step 524.

If, at step 530, the NAK limit has not been reached, the subscriber station evaluates 532 whether the RTT estimate for the RLP call has ever been updated. If it has previously been updated, then the subscriber station stops the RTT counter 534 before starting the NAK timer again 506 and sending the next round of NAK frames 508. Stopping the RTT counter before sending another round of NAK frames prevents retransmit frame ambiguity from causing inaccuracy in RTT estimates. For example, if a retransmit frame were received after a second round of NAK frames had been sent, the subscriber station would not know whether the retransmit frame corresponded to a NAK in the first round or the second round. Incorrectly matching such a retransmit frame to a later NAK round would lead to an incorrect RTT estimate.

Another problem occurs, however, with stopping the RTT counter after expiration of the first NAK timer. If, for some reason, the initial RTT estimate specified during service negotiation was artificially small, then the first NAK timer might expire before a first retransmit frame has the chance to reach the subscriber station. Under these circumstances, the erroneously small RTT estimate might never be updated, and could cause poor performance for the duration of the RLP call.

This problem is solved in the exemplary embodiment by allowing the RTT counter to continue running if the subscriber station determines 532 that the RTT estimate has not yet been updated. If the RTT estimate has not yet been updated, then step 534 is skipped, and the subscriber restarts the NAK timer 506 and sends the next round of NAK frames 508. At worst, this may lead to an updated RTT estimate that is excessively long, but this is preferable over an RTT estimate that is too short. Correspondingly, in the preferred embodiment, step 522 gives the existing RTT estimate little or no weight in the weighted average the first time the RTT estimate is updated. In an alternate embodiment, the weighting of the existing RTT estimate in the first update varies based on the amount by which the first RTT estimate exceeds the existing RTT estimate and on the number of NAK rounds sent before receipt of a retransmit frame.

In an alternate embodiment, the decision at step 532 is based not on whether the RTT estimate has ever been updated, but on whether the hole corresponding to the expired NAK timer is the first hole detected in the RLP session. If the hole was the first detected, then the RTT counter is not stopped before proceeding to step 506. If other holes had previously been detected, then the RTT counter is stopped 534 before proceeding to step 506.

Figure 6:
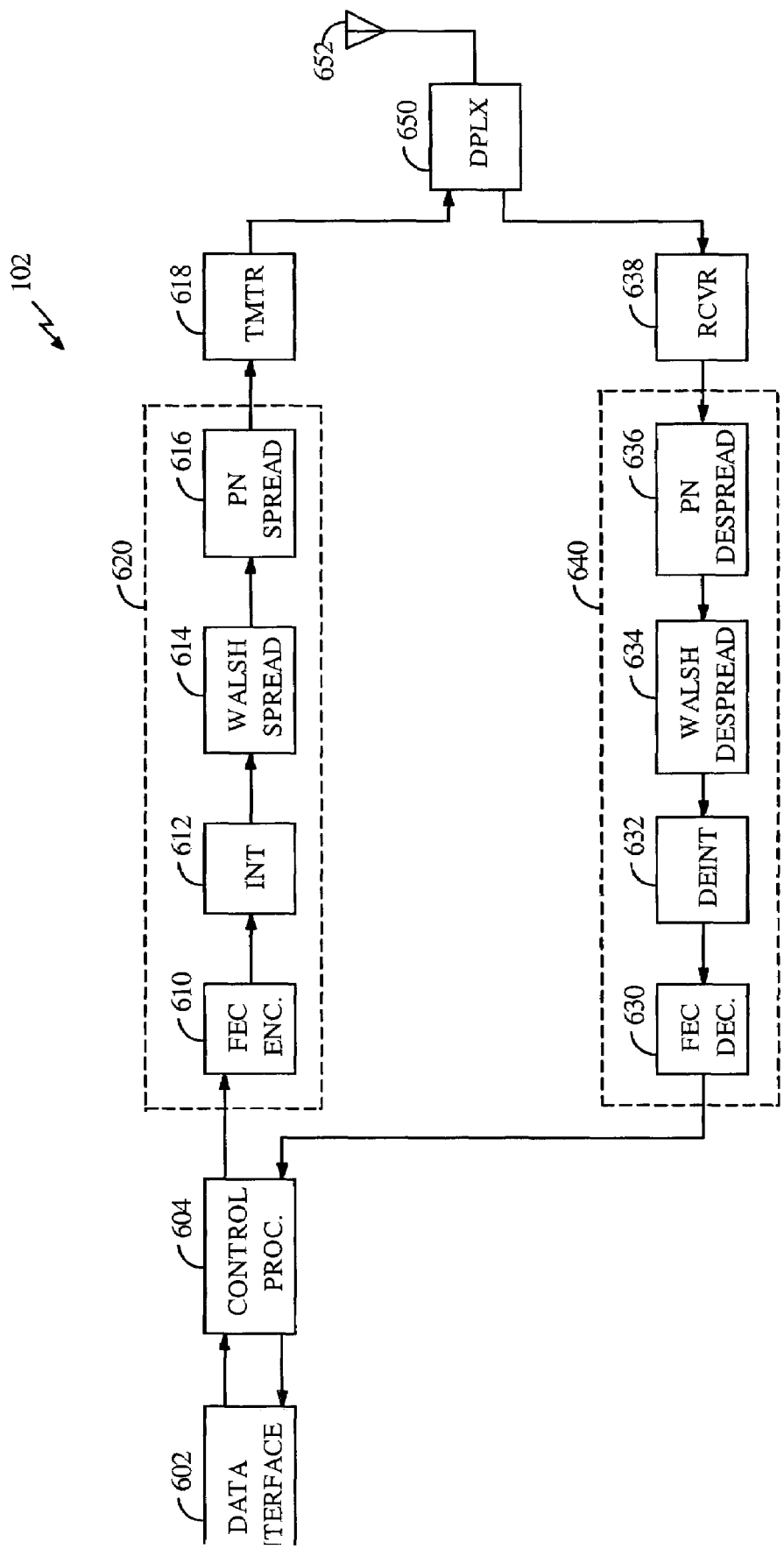
FIG. 6 is a block diagram of an apparatus used to establish and use an RLP link through a CDMA wireless communication channel in accordance with an embodiment of the invention.

FIG. 6 is a block diagram of an apparatus used to establish and use an RLP link through a CDMA wireless communication channel in accordance with an embodiment of the invention. For convenience, the apparatus is described below in terms of a subscriber station. One skilled in the art will recognize that the depicted configuration and its variations may be equally used in conjunction with a wireless base station without departing from the present invention.

The apparatus shown includes data interface 602 that may be connected an external input/output device, for example, a display terminal or handheld or laptop computer. Data interface 602 may be omitted if subscriber station 102 further includes an internal user interface, for example a keypad and a display. For example, subscriber station 102 might be a CDMA wireless personal data assistant (PDA) capable of exchanging data with the Internet and displaying it on a liquid crystal display (LCD).

Whether the raw user data is received through data interface 602 or from some other internal input/output interface, the data is manipulated as necessary by control processor 604. Control processor 604 performs the necessary formatting and protocol encapsulation to send the data over a wireless link. In the preferred embodiment, control processor 604 takes a byte stream received through data interface 602 and encapsulates it into RLP frames for transmission through CDMA modulation module 620. Control processor 604 also extracts data from RLP frames received through CDMA demodulation module 640 and provides the resultant byte stream to data interface 602. In addition to RLP frames, control processor 604 also performs service negotiation by transmitting and receiving Service Request, Service Response, Service Connect and other messages described above through CDMA modulation module 620 and CDMA demodulation module 640.

Control processor 604 is connected to and provides transmit frames to CDMA modulator module 620. In the preferred embodiment, control processor 604 provides the transmit frames to forward error correction (FEC) module 610 which encodes the frames based on an FEC code. FEC module 610 uses any of several forward error correction techniques, including turbo-coding, convolutional coding, or other form of soft decision or block coding. The resulting encoded frames are provided by FEC module 610 to interleaver 612, which interleaves the data to provide time diversity into the transmitted signal. Interleaver 612 utilizes any of a number of interleaving techniques, such as block interleaving and bit reversal interleaving. The output of interleaver 612 is binary, and is then provided to Walsh spreader 614, which spreads the signal using Walsh codes. After Walsh spreading, the output of Walsh spreader 612 is provided to pseudonoise (PN) spreader 616, where it is spread using PN codes. The output of PN spreader 616 is then provided to transmitter 618, where it is upconverted, amplified, and provided to diplexer 650, and then transmitted through antenna 652.

In the preferred embodiment, PN spreader 616 is a complex PN spreader that multiplies the complex output of Walsh spreader 614 by a complex PN code. In an alternate embodiment, PN spreader 616 multiplies the complex output of Walsh spreader 614 by a real (non-complex) PN code.

Signals received through antenna 652 pass through diplexer 650 and are then gain-controlled and downconverted in receiver 638. From there, the signals are provided to CDMA demodulator module 640, within which they are PN despread in PN despreader 636, Walsh despread in Walsh despreader 634, deinterleaved in deinterleaver 632 and FEC decoded in FEC decoder 630. FEC decoder 630 provides the resultant received frames to control processor 604.

In the preferred embodiment, PN despreader 636 is a complex PN despreader that multiplies the complex sample streams from receiver 638 by a complex PN code. In an alternate embodiment, PN despreader 638 multiplies the complex sample streams from receiver 638 by a real (non-complex) PN code. Deinterleaver 632 utilizes any of a number of deinterleaving techniques, such as block deinterleaving and bit reversal deinterleaving. FEC decoder 610 uses any of several forward error correction techniques, including turbo-coding, convolutional coding, or other form of soft decision or block coding.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. An apparatus for transmitting a stream of information bytes comprising:
   means for receiving a message specifying a radio link protocol (RLP) round-trip time (RTT) estimate; and
   means for conducting an RLP communication session using said RTT estimate to determine negative acknowledgement (NAK) message timing.

2. The apparatus of claim 1 wherein said message is a service negotiation message.

3. The apparatus of claim 1 wherein said message is a Service Connect Message.

4. The apparatus of claim 3 wherein said Service Connect Message further specifies a NAK scheme, and further comprising:
   means for applying said NAK scheme in transmissions.

5. The apparatus of claim 1 further comprising:
   means for negotiating, using service negotiation messages, a NAK scheme used during said subsequent RLP communication session.

6. The apparatus of claim 1 further comprising:
   means for negotiating, using service negotiation messages, encryption parameters used during said subsequent RLP communication session.

7. The apparatus of claim 1 wherein said message is a Service Request Message.

8. The apparatus of claim 1 wherein said message is a Service Response Message.

9. The apparatus of claim 1 wherein said message is a General Handoff Direction Message.

10. The apparatus of claim 1 wherein said message is a Universal Handoff Direction Message.

11. An apparatus for transmitting a stream of information bytes comprising:
    means for sending a message specifying a radio link protocol (RLP) round-trip time (RTT) estimate; and
    means for conducting an RLP communication session using said RTT estimate to determine negative acknowledgment (NAK) messaging timing.

12. The apparatus of claim 11 wherein said message is a service negotiation message.

13. The apparatus of claim 11 wherein said RTT estimate is specified by an operator of a base station and is used to determine NAK message timing for a second RLP communication session.

14. The apparatus of claim 11 wherein said message is a Service Connect Message.

15. The apparatus of claim 11 wherein said message is a Service Request Message.

16. The apparatus of claim 11 wherein said message is a Service Response Message.

17. The apparatus of claim 11 wherein said message is a General Handoff Direction Message.

18. The apparatus of claim 11 wherein said message is a Universal Handoff Direction Message.

19. The apparatus of claim 14 wherein said Service Connect Message further specifies a NAK scheme, and further comprising:
    means for applying said NAK scheme in transmissions.

20. The apparatus of claim 11 further comprising:
    means for negotiating, using service negotiation messages, a NAK scheme used during said subsequent RLP communication session.

21. The apparatus of claim 11 further comprising:
    means for negotiating, using service negotiation messages, encryption parameters used during said subsequent RLP communication session.

22. An apparatus for transmitting a stream of information bytes comprising:
    means for establishing a first radio link protocol (RLP) round-trip time (RTT) estimate during service negotiation; and
    means for using said first RLP RTT estimate to determine negative acknowledgment (NAK) message timing in a subsequent RLP communication session.

23. The apparatus of claim 22 further comprising:
    means for measuring the delay between transmitting a NAK frame and receiving a first corresponding retransmit frame to form a second RLP RTT estimate; and
    means for updating said first RLP RTT estimate based on said second RLP RTT estimate.

24. The apparatus of claim 23 wherein said means for updating further comprises a performing a weighted average of said first RLP RTT estimate and said second RLP RTT estimate.

25. The apparatus of claim 23 wherein said means for updating further comprises replacing said first RLP RTT estimate with said second RLP estimate based on receipt of the first retransmit frame of said RLP communication session.

26. An apparatus for transmitting a stream of information bytes comprising:
    means for performing a 3-way handshake to generate a first round-trip time (RTT) estimate associated with a first radio link protocol (RLP) communication session;
    means for establishing a second RTT estimate associated with a second RLP communication session, wherein said second RTT estimate is based on said first RTT estimate, and wherein said second RTT estimate is established during service negotiation; and
    means for using said second RLP RTT estimate to determine negative acknowledgment (NAK) message timing in said subsequent second RLP communication session.

27. The apparatus of claim 26 wherein said means for performing a 3-way handshake is performed between a base station and a subscriber station and said means for establishing a second RTT estimate is performed between said base station and said subscriber station.

28. The apparatus of claim 26 wherein said means for performing a 3-way handshake is performed between a base station and a first subscriber station and said means for establishing a second RTT estimate is performed between said base station and a second subscriber station.

29. The apparatus of claim 26 wherein said second RTT estimate is generated by adding a predetermined guard time to said first RTT estimate.

* * * * *